US009268399B2

(12) United States Patent
Grokop et al.

(10) Patent No.: US 9,268,399 B2
(45) Date of Patent: Feb. 23, 2016

(54) ADAPTIVE SENSOR SAMPLING FOR POWER EFFICIENT CONTEXT AWARE INFERENCES

(71) Applicant: QUALCOMM Incorporated, San Diego, CA (US)

(72) Inventors: Leonard Henry Grokop, San Diego, CA (US); Shankar Sadasivam, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 246 days.

(21) Appl. No.: 13/782,989

(22) Filed: Mar. 1, 2013

(65) Prior Publication Data

US 2014/0247206 A1 Sep. 4, 2014

(51) Int. Cl.
G06F 3/01 (2006.01)
G06F 1/32 (2006.01)
H04M 1/725 (2006.01)

(52) U.S. Cl.
CPC .............. *G06F 3/011* (2013.01); *G06F 1/3287* (2013.01); *H04M 1/72569* (2013.01); *Y02B 60/1282* (2013.01)

(58) Field of Classification Search
CPC combination set(s) only.
See application file for complete search history.

(56) References Cited

U.S. PATENT DOCUMENTS

| 5,505,057 | A  | * | 4/1996 | Sato et al. ........................ 62/231 |
| 8,180,583 | B1 |   | 5/2012 | Gossweiler et al. |
| 2004/0075549 | A1 |   | 4/2004 | Haller |
| 2006/0167647 | A1 |   | 7/2006 | Krumm et al. |
| 2011/0032105 | A1 |   | 2/2011 | Hoffman et al. |
| 2011/0106418 | A1 |   | 5/2011 | Van Der Merwe |
| 2011/0238191 | A1 |   | 9/2011 | Kristjansson et al. |
| 2012/0203491 | A1 |   | 8/2012 | Sun et al. |
| 2013/0238535 | A1 | * | 9/2013 | Leppanen et al. .............. 706/12 |

FOREIGN PATENT DOCUMENTS

WO 2012001215 A1 1/2012

OTHER PUBLICATIONS

International Search Report and Written Opinion—PCT/US2014/014963—ISA/EPO—Apr. 11, 2014.

* cited by examiner

*Primary Examiner* — Linh N Hoffner
(74) *Attorney, Agent, or Firm* — Kilpatrick Townsend & Stockton LLP (57) ABSTRACT

Disclosed is a system, apparatus, computer readable storage medium, and method to perform a context inference for a mobile device. In one embodiment, a data processing system includes a processor and a storage device configurable to store instructions to perform a context inference for the data processing system. Data may be received from at least a first sensor, and a first classification of the data from the sensor may be performed. Confidence for the first classification can be determined and a second sensor can be activated based on a determination that the confidence fails to meet a confidence threshold. A data sample classification from the activated second sensor may be classified jointly with the data from first sensor.

20 Claims, 5 Drawing Sheets

ADAPTIVE SENSOR SAMPLING FOR POWER EFFICIENT CONTEXT AWARE INFERENCES

FIELD

The subject matter disclosed herein relates generally to power management techniques and sensor activation scheduling.

BACKGROUND

Electronic devices can be equipped with a variety of sensors and inputs to monitor and discover information about a device's environment. For example, a device may utilize an accelerometer to measure aspects of device movement or a microphone to measure the device's nearby audio environment.

Programs or applications running on a device may process data from sensors in order to provide an enhanced user experience. A device can infer context based on the sensor data. However, sensor data may sometimes be ambiguous or misleading, and false positives can occur when inferring context based on output from a single sensor. However, activating multiple data sensors can be detrimental to a goal of power efficiency.

Therefore, new and improved sensor management techniques are desirable.

SUMMARY

Embodiments disclosed herein may relate to a method for performing a context inference for a mobile device. The method includes receiving data from at least a first sensor, performing a first classification of the data from the at least first sensor, and determining a confidence value for the first classification. The method further includes activating a second sensor based on a determination the confidence value of the first classification fails to meet a confidence threshold and performing a second classification of a second data sample from the second sensor jointly with the data from the at least first sensor.

Embodiments disclosed herein may also relate to a machine readable non-transitory storage medium with instructions to perform a context inference for a mobile device. The method includes receiving data from at least a first sensor, performing a first classification of the data from the at least first sensor, and determining a confidence value for the first classification. The method further includes activating a second sensor based on a determination the confidence value of the first classification fails to meet a confidence threshold and performing a second classification of a second data sample from the second sensor jointly with the data from the at least first sensor.

Embodiments disclosed herein may also relate to an apparatus that includes means for receiving data from at least a first sensor, means for performing a first classification of the data from the at least first sensor, and means for determining a confidence value for the first classification. The apparatus further includes means for activating a second sensor based on a determination the confidence value of the first classification fails to meet a confidence threshold and means for performing a second classification of a second data sample from the second sensor jointly with the data from the at least first sensor.

Embodiments disclosed herein may further relate to a data processing system including a processor and a storage device configurable to store instructions to perform a context inference for the data processing system. The instructions cause the processor to receive data from at least a first sensor, perform a first classification of the data from the at least first sensor, and determine a confidence value for the first classification. The instructions further cause the processor to activate a second sensor based on a determination the confidence value of the first classification fails to meet a confidence threshold and perform a second classification of a second data sample from the second sensor jointly with the data from the at least first sensor.

Other features and advantages will be apparent from the accompanying drawings and from the detailed description.

DETAILED DESCRIPTION

Device Overview

Figure 1:
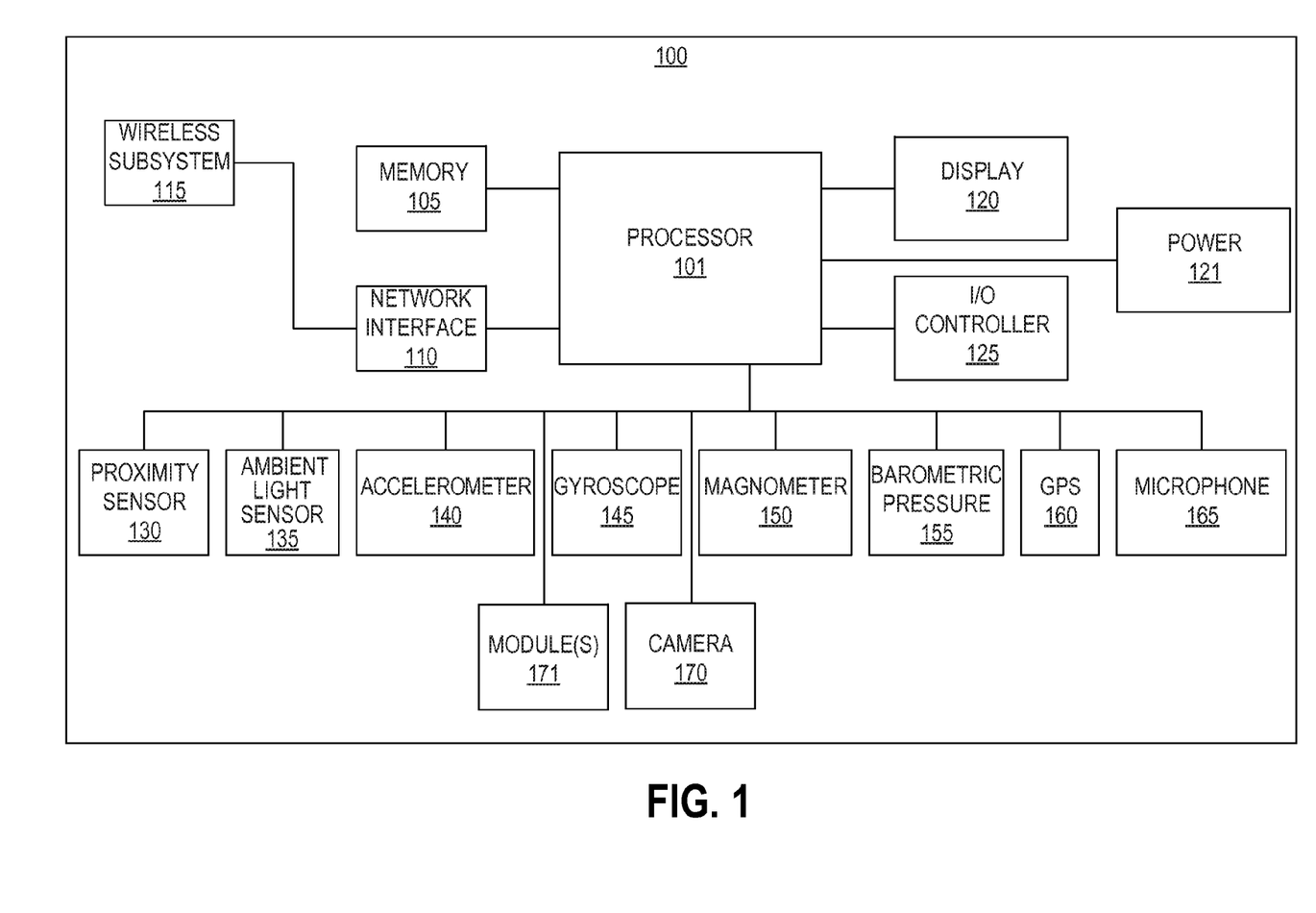
FIG. 1 is a block diagram of a system in which aspects of the invention may be practiced.

FIG. 1 is block diagram illustrating an exemplary data processing system in which embodiments of the invention may be practiced. The system may be a device 100, which may include one or more processors 101, a memory 105, I/O controller 125, and network interface 110. The device 100 may also include a number of device sensors coupled to one or more buses or signal lines further coupled to the processor 101. It should be appreciated that the device 100 may also include a display 120, a user interface (e.g., keyboard, touchscreen, or similar devices), a power device 121 (e.g., a battery), as well as other components typically associated with electronic devices.

In some embodiments the device 100 may be a mobile or non-mobile device. The network interface 110 may also be coupled to a number of wireless subsystems 115 (e.g., Bluetooth, WiFi, Cellular, or other networks) to transmit and receive data streams through a wireless link to/from a wireless network, or may be a wired interface for direct connection to networks (e.g., the Internet, Ethernet, or other wireless systems). Thus, the device 100 may be a: mobile device, wireless device, cell phone, personal digital assistant, mobile computer, tablet, personal computer, laptop computer, or any type of device that has processing capabilities.

The device 100 can include sensors such as a proximity sensor 130, ambient light sensor (ALS) 135, accelerometer 140, gyroscope 145, magnetometer 150, barometric pressure sensor 155, and/or Global Positioning Sensor (GPS) 160. In some embodiments, microphone 165, camera 170, and/or the wireless subsystem 115 are used as sensors to analyze the environment of the device 100. For example, the microphone 165 can provide audio data for determining whether the device 100 is inside a moving automobile or in a quiet office. Each sensor may be implemented on the same or different subsystems. When implemented on different and separate subsystems, each sensor may have dedicated power such that each sensor can be independently powered or unpowered. Independent separate subsystem sensors may still communicate with each other and other components in the device 100 over the signal lines or buses described above.

The memory 105 may be coupled to the processor 101 to store instructions for execution by processor 101. In some embodiments, the memory 105 is non-transitory. The memory 105 may also store one or more models or modules to implement embodiments described below. The memory 105 may also store data from integrated or external sensors. In addition, the memory 105 may store application program interfaces (APIs) for accessing one or more modules 171 (e.g., a Content Aware Sensor Manager module) described in greater detail below. The memory 105 may also store configuration files describing pre-defined feature scheduling information, training data sample, sensor data sample, or power profiles related to classes or features.

It should be appreciated that embodiments of the invention as will be hereinafter described may be implemented through the execution of instructions, for example as stored in the memory 105 or other element, by processor 101 of device 100 and/or other circuitry of device 100 and/or other devices. Particularly, circuitry of device 100, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device 100. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device 100 itself and/or some or all of the functions, engines or modules described herein may be performed by another system connected through I/O controller 125 or network interface 110 (wirelessly or wired) to device 100. Thus, some and/or all of the functions may be performed by another system and the results or intermediate calculations may be transferred back to device 100. In some embodiments, such other device may comprise a server configured to process information in real time or near real time. In some embodiments, the other device is configured to predetermine the results, for example based on a known configuration of the device 100.

Content Aware Sensor Manager Overview

Device sensors can provide contextual data about a user and environment. Context, as used herein may be any information that can be used to characterize the situation of a user. For example, context can describe what a user is doing, the user's environment/surroundings, where the user is, or what intentions the user may have.

In one embodiment, a Content Aware Sensor Manager (CASM) (e.g., implemented as a module 171 or engine can opportunistically turn on, power up, or activate additional sensors on the same or other subsystems) to improve performance of context aware inferences. In some instances, a single sensor data sample may be insufficient to provide an accurate context inference or classification. Therefore, one or more additional sensor streams may be activated.

For example, based on an accelerometer data sample, the CASM or a dedicated classifier may determine the mobile device is placed on the surface of a desk or table. The accelerometer may determine orientation of the surface of the device with respect to gravity. Orientation may be characterized by angle measurements of pitch and roll. Based on the orientation of the device (e.g., angled consistent with a flat on a desk placement) and/or a lack of detectable motion recorded by the accelerometer, the CASM or dedicated classifier may infer the device is stationary on a desk surface. However, the confidence in the placement on the desk classification may be low, and the CASM can activate additional sensors to verify the classification. For example, activating and classifying data from the GPS 160 may infer that the user is on a public road with the mobile device placed on a car dashboard. When the user is on a street or road, the user and mobile device are unlikely to be at a desk. The combination of the accelerometer 140 and the GPS 160 can have an associated joint confidence value indicating whether the user is most likely (i.e., has a high confidence) to be at a desk or driving in a car. In some cases, the additional sensor data and classification for two or more sensors can provide a higher confidence in a particular classification.

In another example, the accelerometer may determine a user has the mobile device in a pocket, as indicated by the angle consistent with pocket placement. Again, the CASM, may not have high enough confidence to determine whether the user is sitting in a work environment (e.g., at a desk), or sitting in a car while the car is momentarily at rest. As above, additional sensors may be activated and classified in order to resolve classification ambiguity. Further details are described in greater detail below.

The CASM or a dedicated classifier can classify one or more sensor streams (e.g., in one or more classification iterations) until a final determination of context for the user is determined. In one embodiment, the CASM can process or compute features from a sensor data sample, and output a classification (e.g., state or context aware inference). For example, as CASM receives sensor data, meaningful features representing the discriminatory aspects of the data can be computed and matched to a model to determine a best-fit classification. Because a sensor data sample may provide ambiguous or inaccurate classifications, the CASM may trigger or activate one or more additional sensors to verify or strengthen an initial classification, or when a confidence associated with the classification is below a pre-determined threshold.

In one embodiment, Bayesian probabilities can be used in model classifications. For example, the CASM may determine which class has the highest probability and output the maximum probability as the confidence. Alternatively, the CASM may output the difference between the maximum probability classification and the next most probable (i.e., second maximum) classification as the probability. For example, a first classification probability may be 0.6 and a second classification probability may be 0.4, where 1 represents a certainty of occurrence, and 0 represents a certainty of non-occurrence. In this previous example, the difference between the first classification probability of 0.6 and the second classification probability of 0.4 would be 0.2, a relatively low confidence. In a second example, the probability for a first classification is 0.9 and the probability of a second classification is 0.1. In this second example, the difference between the two classifications is 0.8, which may be a relatively high confidence.

In other embodiments, support vector machines may be used to determine data points. For example, a nearest neighbor classifier may compute feature vectors and find the nearest feature vector from a known universe of possible data points. By referencing a historical or known set of data points, a particular classification may be assigned. For example, a feature vector may match a nearest point and the point can be assigned or associated with a specific classification. When a feature vector cannot match a nearest point or if the feature vector cannot be associated with a specific classification, additional sensors may be triggered or activated. The additional sensor data may be classified based on a nearest neighbor classifier as described above. Alternatively, more sensors may be triggered/activated until a classification match can be determined.

Figure 2:
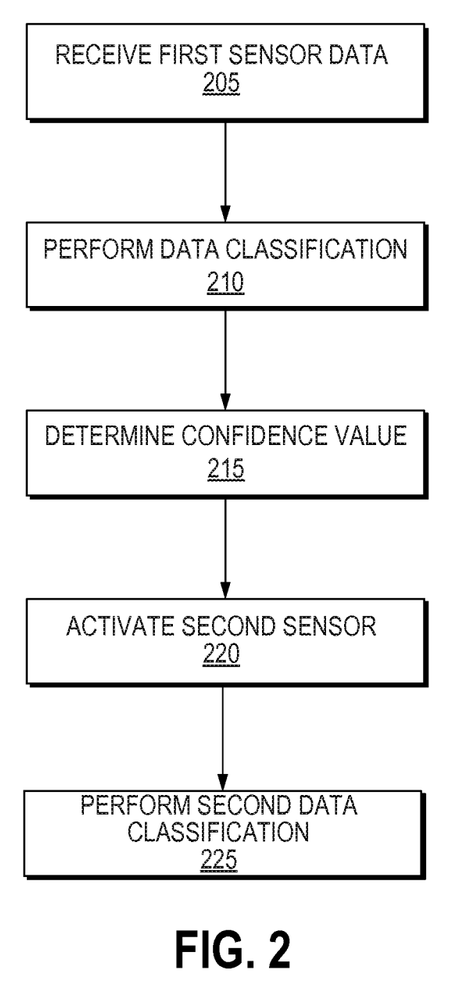
FIG. 2 illustrates a flow diagram of a context aware sensor manager, in one embodiment.

FIG. 2 illustrates a flow diagram of the CASM, in one embodiment. At block 205, the CASM can receive data from at least a first sensor (e.g., a proximity sensor 130, ALS 135, accelerometer 140, gyroscope 145, magnetometer 150, barometric pressure sensor 155, GPS 160, microphone 165, and camera 170).

At block 210, the CASM or a classifier can perform a classification of the data from at least the first sensor. For example, the first data sensor may output a first data sample for processing. The CASM can run a feature computation on the first data sample and the feature computation may be compared to a predetermined training data set to output a classification. In one embodiment, the first data sample provides a temporary classification and the CASM may determine to provide the temporary classification as the final output classification based on a confidence in the temporary classification. Further details of feature calculation are described below.

At block 215, the CASM can determine a confidence value for the first classification. The confidence value may be based on one or more factors as described in greater detail below.

At block 220, the CASM can activate a second sensor based on a determination the confidence value of the first classification fails to meet a confidence threshold. For example, given a low confidence in a previous classification, the CASM may activate an additional sensor and run another classification determination using an additional sensor different from the sensor used in the previous classification.

At block 225, the CASM can perform a second classification of a second data sample from the activated second sensor jointly with the data from at least the first sensor. In one embodiment, the classification of the additional sensor data also has an associated individual confidence, or an overall confidence of both the first and second data classifications. In one embodiment, the first and second sensor data classifications may be jointly classified in order to determine a final/output classification and associated confidence value. In some embodiments, two sensor data samples may be classified separately and independently, two the different classifications are provided and the CASM may output the highest confidence value of the two independent classifications (from the first and second sensors). In other embodiments, the CASM may automatically output the second sensor classification based on a determination that classifying the first classification did not meet an associated confidence threshold. In yet other embodiments, the CASM may output all determined classifications and their associated confidence and a program or application may further process the results to make an independent determination of classification and ultimately infer context. Classification and confidence generation are described in greater detail below.

Sensor Data

The CASM may process or compute data received from one or more sensors attached to the mobile device (e.g., a proximity sensor 130, ALS 135, accelerometer 140, gyroscope 145, magnetometer 150, barometric pressure sensor 155, GPS 160, microphone 165, and camera 170) to report information related to a device's environment. In some embodiments, the CASM can receive external sensor data from communicatively connected external devices (e.g., via a USB connection or WiFi connection to an external camera) through the I/O controller 125. The CASM or a dedicated classifier (e.g., an always-on or frequently active classifier) can classify sensor data.

The CASM or a dedicated classifier can receive raw sensor data for use in classification (i.e., feature computation) as described below. Alternatively, an intermediary device or program can pre-process sensor data before feature computation. For ease of description, sensor data as used herein refers to unprocessed data (e.g., data received from an accelerometer 140, ambient light sensor 135, microphone 165 or other sensor). For example, data from an accelerometer 140 may have attributes of time, acceleration along an x-axis, acceleration along a y-axis, and acceleration along a z-axis. However, a person of ordinary skill in the art will recognize that sensor data may be received and processed in other forms other than the examples given here.

As used herein, a data sample can include a portion of data received or output from a sensor (e.g., the sensors of the device 100). A sensor data sample may be sampled at a particular frequency (e.g., 50 Hz, 60 Hz or other rate depending on the sampling device and the data requirements). Feature computation may be performed on a moment, slice, or window of time selected from a stream or set of sensor data. For example, device 100 may compute features over a 1 second time period selected from a longer stream (e.g., a 10 second time period, constantly on sensor, or some other time period). For example, raw accelerometer 140 data may be sampled at 60 Hz such that 1 second of data provides 60 3-dimensional accelerometer 140 vector samples in the x-axis, y-axis, and z-axis for a net input size of 180 samples.

In one embodiment, the CASM or a dedicated classifier, can compare a sensor data sample to a training data sample to classify the sensor data sample. For example, in a test/training setting, sensors may receive a variety of inputs to cover possible real-world contexts, and the resulting feature computations and classifications can be recorded. Using this pre-computed historical data, a current sensor data sample can be compared to estimate a most likely classification as well as for assigning the classification a confidence.

In other embodiments, instead of directly using training data to classify the data (e.g., nearest neighbor classifier), models pre-computed from the training data may be used (e.g., Support Vector Machines, Neural Network, Decision Tree, Bayesian Classifier, etc.).

In one embodiment, accuracy of classifications may improve if multiple sensors of different types are used. For example, two or more sensors with a joint classification may nonetheless result in a low confidence classification (e.g., microphone and accelerometer may not be enough to determine a high confidence meeting classification). Therefore, additional sensors (e.g., GPS or other motion sensor) may be triggered or activated to further boost confidence in a final classification.

In one embodiment, the sensor data samples may be from the same or different sensor subsystems of the device 100. For example, the accelerometer may be on a separate sensor subsystem to receive power while a GPS on a different subsystem is unpowered.

In one embodiment, the CASM may determine whether a classification confidence threshold is met based on the computed feature. In one embodiment, the threshold confidence can be determined by comparing the feature with a training data set. Confidence is discussed in greater detail below.

In one embodiment, the CASM has access to power profiles of available sensors. The power profile may estimate the average or likely power usage requirements of a particular sensor so that the CASM can order the sequence of sensor activations from least power usage to greater power usage. For example, the accelerometer 140, clock, and ambient light sensor 135 may have a power profile identifying it as a low power use. Conversely, the WiFi sensor and GPS 160 may have a power profile identifying them as a high power use. Therefore, the CASM may determine that the accelerometer 140 should be prioritized for activation over the GPS 160, or an ambient light sensor 135 over WiFi, all else being equal. In another example, the gyroscope 145 and microphone 165 may be in between the accelerometer 140 and GPS 160 with regards to power usage. Therefore, in one example, the accelerometer 140 may be set to be the first initial sensor that is always on or first to activate, the gyroscope 145 may be the second sensor activated to strengthen a classification determination, and the third sensor may be the GPS 160 when all other sensors are unable to be leveraged for a high confidence classification.

In other embodiments, the power profile of a sensor is one of a number of factors to determine which first or additional sensor is activated. For example, a sensor data sample from a gyroscope 145 may contain less valuable context inference data than for example the GPS 160, therefore, the gyroscope 145 may be bypassed such that the GPS 160 is activated instead. The value determination may vary based on an initial classification. For example, the initial classification may be ambiguous as to whether the classification is in a meeting, and additional sensors such as a microphone or accelerometer may be more useful than a GPS because indoor signal reception may be poor.

Also, the CASM may determine that a variety of sensors of different types are helpful to determine context despite their power characteristics. For example, to determine whether a user is in a meeting, the clock, accelerometer 140, and microphone 165 can all be useful to infer context, however each one in isolation may provide an incomplete picture.

In other embodiments, the CASM may activate two or more sensors initially and activate additional sensors at a later point in time. For example, the accelerometer 140 and the gyroscope 145 sensors may be active initially, and the GPS 160 may be the additional sensor activated when a classification ambiguity is detected. In another example, the clock and the accelerometer 140 may be always on in a device, and the WiFi sensor may be activated at a later time to resolve classification ambiguity.

In one embodiment, the CASM may automatically trigger a hardware interrupt to power a second sensor on a different subsystem. For example, upon determining a low confidence classification, the CASM may trigger or power up other sensors on different sensor subsystems.

Feature Classification

In one embodiment, the CASM can compute, process, or extract one or more features from sensor data as disclosed above (e.g., raw data from a microphone 165, accelerometer 140, ambient light sensor 135 or other input). Features described herein refer to the result or output of computations executed on sensor data. Features can be used to classify a data set. For example, the CASM can receive as input, raw sensor data (e.g., a sensor data sample) from accelerometer 140, and calculate mean and/or standard deviation. The CASM can use the mean and/or standard deviation to classify or provide context to the sensor data. For example, the classification of a motion sensor may be: walking, sitting, running, or driving, just to name a few. In one embodiment, the features are the values, outputs, or results from computer code executed in memory 105 by a processor 101.

In one embodiment, the CASM may jointly classify two or more sensor data samples from two or more different sensors. For example, the CASM may read data from the accelerometer and the GPS and provide a classification (e.g., running, driving in a car, or other motion based classification) using the two different sensor data samples in a joint classification. The two different sensor data samples may be sampled from the same window or range of time. In another example, the CASM may first classify data from a first sensor, and determine the classification does not meet a confidence threshold. Upon activating a second sensor, the CASM can classify the first sensor data jointly with the activated second sensor to determine a final classification based on sensor data received from both sensors.

In some embodiments, the CASM may call a separate classifier (e.g., a separate classifier module from the CASM) to compute features. A classifier can take features and compare them to a model to produce an inference (e.g., to determine a most likely classification or state). The separate classifier may be able to process multiple sensor streams. Alternatively, there may be a separate classifier for each type of sensor. The CASM as described herein may include an integrated classifier such that the CASM can produce a classification or state output or the classifier may be separate and independent.

Confidence

As described above, the CASM can associate a confidence (e.g., confidence value or level) with each individual data sensor sample classification or joint data sensor sample classification. The CASM may use confidence as a way to determine whether additional sensors should be activated. The confidence may be compared to a confidence threshold and classifications not meeting or exceeding the confidence threshold can be verified against a second classification from an additional sensor data sample.

In some embodiments, in addition to the individual confidence values for the first and second classifications described above, an overall confidence may also be associated with the combination of two or more sensor classifications. In some embodiments, the CASM may maintain a cumulative overall confidence taking into account multiple individual confidence values from one or more sensor data classifications. The cumulative overall confidence may be initiated upon a second sensor activation, upon a first confidence failure, or upon determination of a second classification confidence. For example, upon determining a first and second data sensor classification and associated confidences, the second confidence may be a confidence in the second data sensor classification only, and an overall confidence (e.g., a third confidence in this example) represents the confidence of the first and second classifications together. Because joint classifications classify two or more sensor data samples, confidence of a joint classification may result in one confidence value similar to an overall confidence as described above (e.g., instead of an independent confidence in addition to an overall confidence).

The CASM may use the overall confidence to determine whether to continue to activate additional sensors. For example, a first sensor data sample may result in a low confidence classification, and a second sensor data sample may also result in a low confidence classification. However, the CASM may in some embodiments, determine that when two or more sensor data samples infer the same classification the overall confidence may still be high enough to pass the confidence threshold.

In another example, a first sensor data sample may result in a low confidence classification, and a second sensor data sample may result in a high confidence classification. In this example, the CASM may determine that second sensor data sample is more likely to provide a correct classification based on the failure of the first data sample to overcome a minimum confidence. Therefore, the CASM may ultimately output a final determination classification based on the second sensor data sample.

In one embodiment, the confidence threshold is determined based on a predetermined value based on historical or training data. For example, training data may indicate a threshold confidence that provides an ideal balance between power consumption and context inference performance. In some embodiments, a user may adjust the threshold to achieve a different balance. In yet other embodiments, the CASM may independently adjust the threshold based on what type of sensor is used, the number of sensors, or other factors.

Confidence can be computed based on the distance of the current data point (e.g., a data point output from a feature calculation) to the nearest classification, with small distances corresponding to high confidence and large distances corresponding to low confidence.

The measure of distance may vary. For example, a GPS 160 clustering algorithm that attempts to associate the user's current location with a nearest cluster can use the geographic distance from the user to the cluster centroid as a measure of distance.

For a classifier that outputs probabilities or likelihoods, a confidence can be computed based on these output probabilities or likelihoods. For example, for a classifier that outputs posterior probabilities $P_i$ for each class, a confidence can be computed based on the maximum probability, e.g.

$$C = \max_{i=(1,2,\ldots)} P_i$$

For a classifier that outputs likelihoods $L_i$ for each class, a confidence can be computed based on the normalized relative likelihoods. For example, $$C = \frac{\log L_{i1} - \log L_{i2}}{|\log L_{i1}| + |\log L_{i2}|}$$

where i1 is the index of the most likely class, and i2 is the index of the second most likely class.

Ambiguous Classifications

In one embodiment, the CASM determines a classification or state based on the sensor sample data. In other embodiments, the classifier outputs a state or classification to the CASM. For example, if the classifier outputs classification A which is known to be typically confused with state B, the CASM can activate or enable an additional sensor stream to verify the classification is correct.

In one embodiment, the CASM determines which additional sensor to activate based on the ambiguous classifications. For example, confusion between classification A and B may result in activating on sensor C to resolve the specific ambiguity. In another example, confusion between classification A and D may result in activating on sensor E to resolve this ambiguity.

Figure 3:
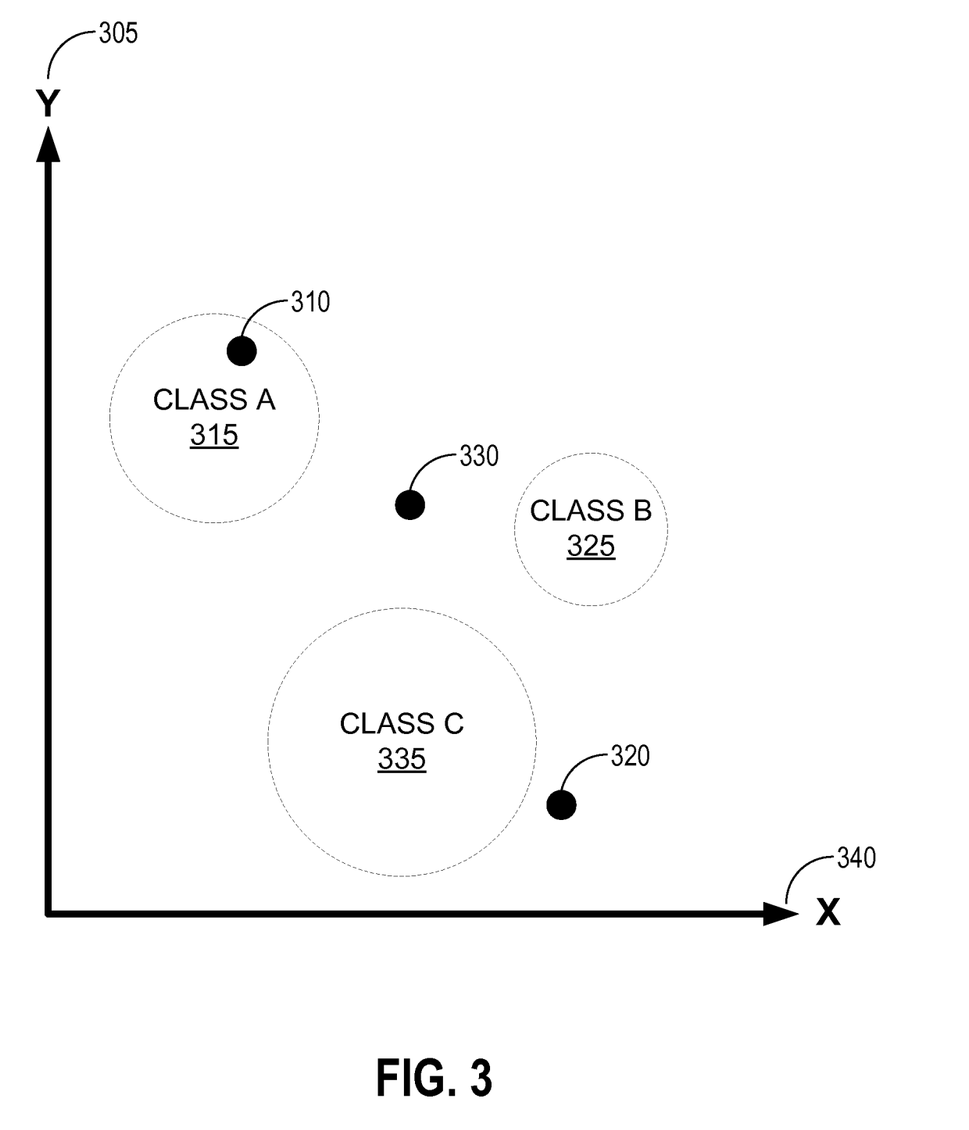
FIG. 3 illustrates a chart of sensor data classifications, in one embodiment.

FIG. 3 illustrates a chart of sensor data classifications, in one embodiment. FIG. 3 illustrates three classification clusters (e.g., as based on prior calculated training data samples). Class A 315, Class B 325, and Class C 335 are three possible classifications based on feature calculation from one sensor (e.g., a first activated sensor). The X 340 and Y 305 axes may represent the resulting features from feature calculations performed on the raw data from a sensor. Clusters of classifications based on historical or prior training data can be used by the CASM to determine the confidence of a current/new classification. For example, if a point 310 (e.g., point representation of a classification from a sensor data sample) lies within a known range or cluster of Class A historical classifications, then the CASM may have a high confidence that the point 310 is Class A and output the context inference associated with Class A without activating additional sensors.

If a point (e.g., the point 320) lies outside of any cluster but is closest to a particular cluster (e.g., point 320 closest to Class C 315 despite being outside of the cluster), the CASM may output a low confidence classification (e.g., a temporary classification) which would still trigger a additional/second sensor. Upon triggering or activating the second sensor, the CASM or classifier may classify the data based on either the second sensor data alone or jointly classify the first and second sensor data together. If the joint or second sensor classification results in a higher confidence classification (e.g., results in features inside Class A 315, Class B 325, or Class C 335 clusters), the higher confidence classification may be chosen for output by the CASM. If a temporary classification was generated, the temporary classification may be overridden by the most recent joint or independent classification based on the additional sensor data sample. If the additional sensor data sample agrees with the nearest classification estimation, the agreed classification is outputted with higher confidence than if only one sensor or data sample classified the data. If the additional sensor data sample results in a different classification than the first data sample, the CASM may activate additional sensors in addition to the second sensor, or alternatively may make a determination as to which of the classifications to output for example based on the relative confidence levels of each individual classification.

If a point (e.g., point 330) lies outside of a known cluster (e.g., Class A 315, Class B 325, or Class C 335), then the CASM may have a low confidence that the point can be accurately classified. In some embodiments, if the point is equidistant from two or more nearest classifications (e.g., Class A 315, Class B 325, or Class C 335 are all equidistant for the point 330 in this example), the CASM may not output any classification and trigger an additional/second sensor. Upon triggering/activating the second sensor, a joint or independent data sensor classification can be obtained as described above. For example, if the joint or independent classification is high confidence (e.g., within a cluster), the classification is chosen and output by the CASM. Otherwise, if there is still some ambiguity as to the classification (e.g., low confidence), then additional sensors may be activated and further classifications may be determined Ambiguous Change of Classification In one embodiment, the CASM can make a determination to turn on additional sensors based on a change in classification. The determination to turn on additional sensors based on a change in classification may be independent from the confidence of the particular classification.

The CASM may determine that a user is unlikely to transition directly to/from certain classifications. For example, the CASM may process a data sensor sample from an accelerometer 140 that infers a user may be driving in a car based on sensor data sampled at time window $T_1$. If at the next classification from the same sensor but at the next time window $T_2$, the classification infers the user is sitting at a desk, the CASM can determine that this direct transition (i.e., car to desk) is unlikely. Upon determining the transition is unlikely the CASM may determine the overall classification confidence to be low, or may lower the individual confidence associated with the most recent classification. Users are more likely to have an intermediate transition between driving to an office, such as getting out of the car, standing, and then walking from the car to the office before resuming a sitting position at a desk. Therefore, the CASM may activate an additional sensor, such as a microphone 165, and classify the sensor data sample to determine if the user is still in the car. If the microphone 165 sensor data sample is unable to provide a high confidence classification, the GPS 160 may be activated. After a verification classification can be determined (e.g., with one or more additional sensor activations after the improbable transition is detected) the CASM can make an ultimate determination of classification (e.g., the user has indeed left the car and is sitting at a desk, or the user is still in the car). Therefore, the CASM can activate additional sensors before providing an erroneous or inaccurate final output classification.

In one embodiment, the CASM has access to (e.g., in device 100 memory) probable and improbable classification transitions (e.g., a state diagram, database or flat file of transitions). For example, transitioning from driving to/from walking and sitting at a desk to/from walking are just two example probable transitions. However, driving to/from sitting at a desk is an improbable transition when no other intermediate transitions or classifications have been detected.

In another example, a user may be in a meeting as determined by classifying a data sample from an audio source (e.g., microphone 165) when no further audio is present in the audio source. The CASM can activate an accelerometer 140, GPS 160 or other motion based sensor to verify the user exited or is in the process of exiting the meeting. Otherwise, if the user and device 100 are stationary, the confidence that the user is still in the meeting may be increased or maintained.

In one embodiment, the internal clock of the device 100 is used as an additional sensor. The CASM may also use the internal clock as a time sensor to determine how long a user is in a meeting. If a recorded duration of time is too short, too long, or the meeting ended after a time period not likely to be a typical meeting length, the confidence of the classification "in meeting" may be lowered. For example, typical meetings may last for at least 15 minutes, and may often last 30 minutes to one hour. Meetings less than 15, meetings more than two hours, or meetings ending after a duration other than 15 minute increments may cause the CASM to activate additional sensors and compare the classification of the additional sensor(s) to the first sensor classification.

Figure 4:
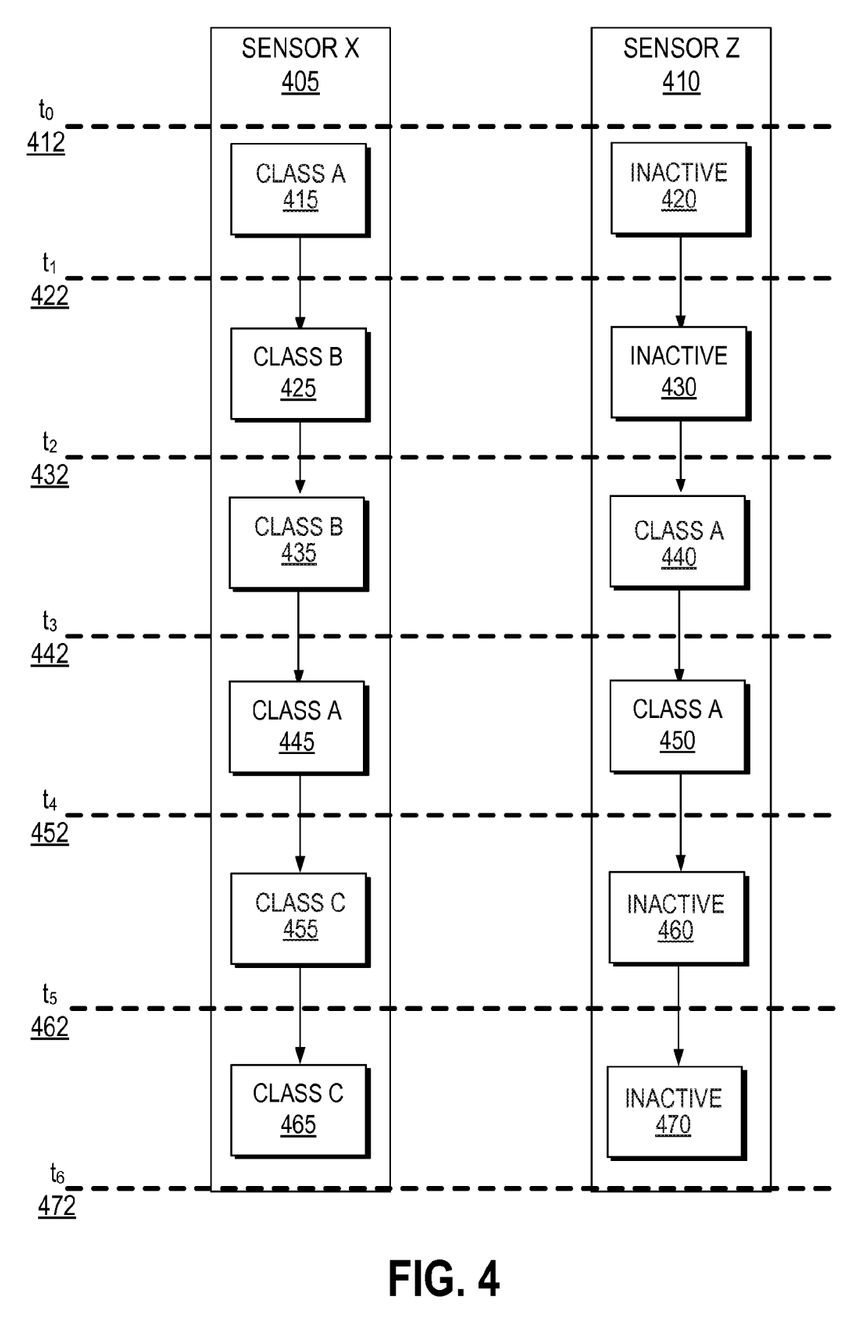
FIG. 4 illustrates a flow diagram of sensor activation upon detection of specified classification transitions, in one embodiment.

FIG. 4 illustrates a flow diagram of sensor activation upon detection of specified classification transitions, in one embodiment. In one embodiment, an initial active sensor may output sensor data samples to the CASM or dedicated classifier. The sensor data samples may be sampled over a period of time (e.g., sample time periods of: $t_0$ 412 to $t_1$ 422, $t_1$ 422 to $t_2$ 432, $t_2$ 432 to $t_3$ 442, $t_3$ 442 to $t_4$ 452, $t_5$ 452 to $t_5$ 462, and $t_5$ 462 to $t_6$ 472).

During the first time window $t_0$ 412 to $t_1$ 422, Sensor X 405 has classified the data sample as Class A 415, and Sensor Z 410 is inactive 420 (e.g., no power is applied to the sensor, therefore no Sensor Z 410 data sample is available during time window $t_0$ 412 to $t_1$ 422).

During the next time window, $t_1$ 422 to $t_2$ 432, Sensor X 405 outputs a sensor data sample indicating a Class B 425 classification. Sensor Z 410 is still inactive, as the CASM has just finished processing the data sample from window $t_1$ 422 to $t_2$ 432. In one embodiment, the CASM can compare a current classification to an immediately prior in time ($t_0$ 412 to $t_1$ 422) classification to detect unlikely or improbable classification changes or transitions. In this example, the CASM determines that the output from Sensor X 405 had an immediately prior in time ($t_0$ 412 to $t_1$ 422) classification of Class A and a current classification of Class B. In this example, the transition from Class A to Class B was predetermined as unlikely or improbable (e.g., Class A may be driving in a car, and Class B may be sitting at a desk). Upon detecting an unlikely or improbable change in classification has resulted from a sensor (e.g., Sensor X 405), the CASM can activate an additional sensor (e.g., Sensor Z 410) to verify the current classification. In this current example, the CASM activates Sensor Z 410 after the unlikely or improbable class transition (Class A to Class B) is detected (e.g., at time $t_2$).

During the next time window $t_2$ 432 to $t_3$ 442, Sensor X 405 outputs a sensor data sample resulting in a Class B 425 classification. The CASM classifies the sensor data sample from Sensor Z 410 as Class A 435 during window $t_2$ 432 to $t_3$ 442. In one embodiment, the CASM suppresses the Class B 435 determination from Sensor X 405 to output a Class A 440 output. In one embodiment, the CASM may ignore the Sensor X 405 classifications until a new transition is detected.

During the next time window $t_3$ 442 to $t_4$ 452, Sensor X 405 data is classified as Class A 445 and the CASM may de-activate Sensor Z 410 (e.g., after time $t_4$). In this case, the CASM may determine the transition from Class B to Class A triggers the activation of Sensor Z 410 again. However, the CASM may grant exceptions to the general rule of detecting an improbable transition when returning from a prior transition that was also improbable. In the current example, Class A 415 to Class B 425 was an improbable change in classification causing the CASM to trigger an additional sensor to verify the class change. However, when the initial sensor reverted back to Class A 445 from Class B 435, the CASM may not trigger the activation of Sensor Z 410 because the Class B 435 classification is treated as an erroneous reading ignored by the CASM. In some embodiments, the CASM triggers an additional sensor when a high confidence classification transitions to a low confidence classification, but may not trigger additional sensors when a low confidence classification transitions to a high confidence classification.

In some embodiments, one or more additional sensors may remain active for a pre-determined or user determinable number of window samples before de-activating. For example, a configuration setting for power conservation may immediately to turn off additional sensors after they provide a verification classification to the CASM. Conversely, a configuration setting prioritizing performance over energy conservation may cause additional sensors to remain active for a number of additional cycles or windows beyond the end of an ambiguous classification or unlikely transition.

During the next time window $t_4$ 452 to $t_5$ 462, the sensor data sample from Sensor X 405 is classified as Class C 455, which is a possible classification transition that does not trigger an additional sensor.

During the next time window $t_5$ 462 to $t_6$ 472, the sensor data sample from Sensor X 405 is classified as Class C 465, which is a classification transition from Class A 414 that does not trigger an additional sensor. Therefore, Sensor Z 410 remains inactive because it was not triggered at time $t_5$.

Content Aware Sensor Manager

The CASM may be initiated based on the feature vector computed from the raw sensor data. For example, if the computed feature vector lies in an ambiguous region of the feature space, additional sensor streams can be enabled. The distance of the feature vector from the nearest classes can be used for this determination. For example, the standard deviation of the accelerometer 140 norm and the average orientation of the device may indicate the data can be generated either by walking or driving, with the distance of the feature vector to the centroid of each of these classes being small and similar.

The CASM may also be initiated based on performing a confidence test on classifier outputs and enabling additional sensor streams (residing on the same or other subsystems) if the reported confidence is below a pre-determined threshold.

Figure 5:
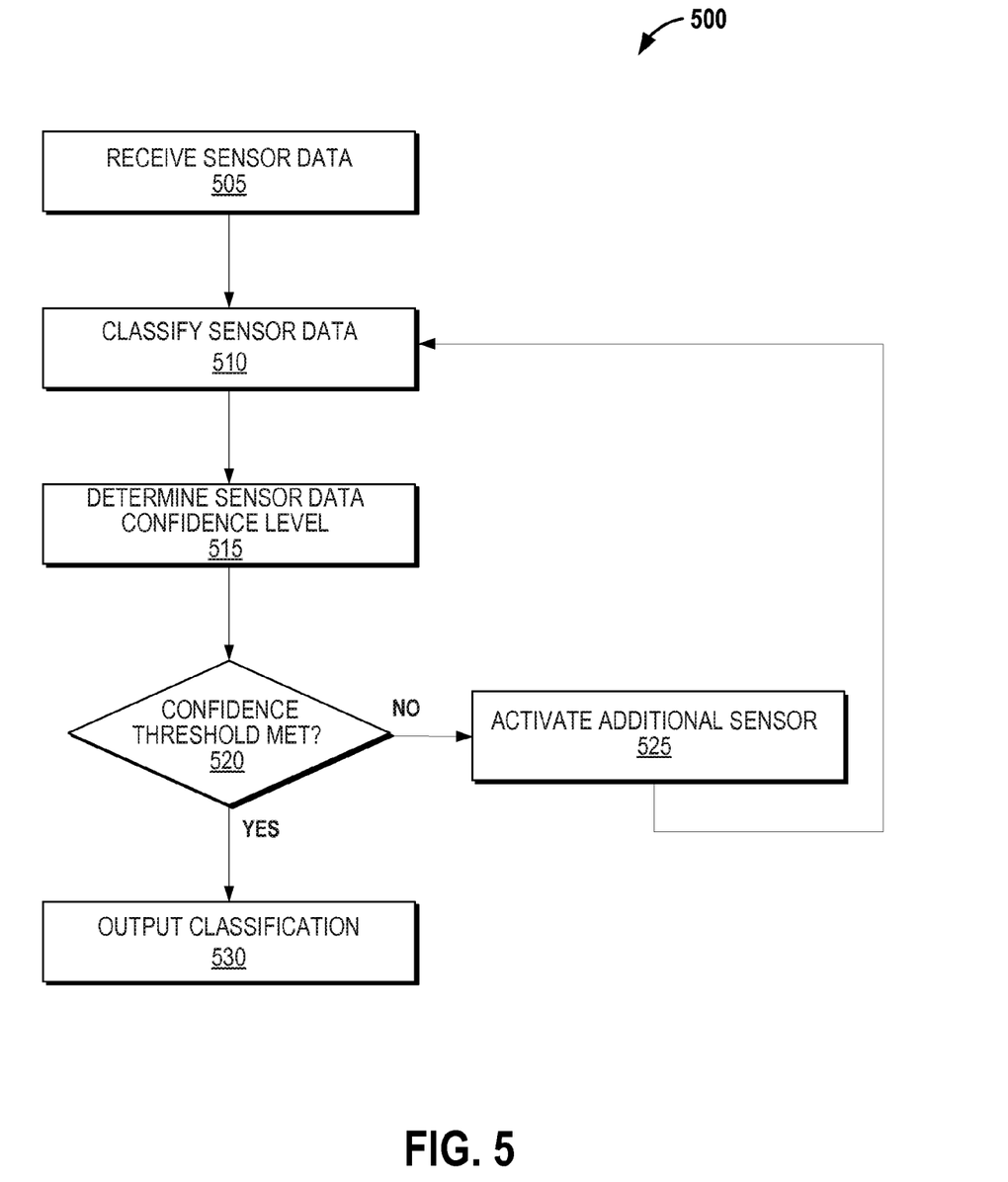
FIG. 5 illustrates a flow diagram of a context aware sensor manager, in another embodiment.

FIG. 5 illustrates a flow diagram of the CASM, in one embodiment. At block 505, the CASM can receive or access sensor data (e.g., a sensor data sample).

At block 510, the CASM can attempt to classify the sensor data received in the previous block 505. Data classification may involve feature calculation as described above.

At block 515, the CASM can determine a confidence associated with the determined classification from the previous block 510. The confidence may be based on one or more of the factors described above.

At block 520, the CASM can determine whether the confidence associated with the sensor data meets or exceeds a confidence threshold. For example, the confidence threshold may be a pre-determined confidence level or value known to provide for accurate classifications. Low confidence may indicate the classification determined in block 510 is inaccurate or untrustworthy. If the CASM determines the classification does meet or exceed a minimum level of confidence, a final determination is output at block 530. Alternatively, if the CASM determines the classification does not meet a pre-defined minimum level of confidence, the CASM can activate one or more additional sensors at block 525 and the CASM can classify the additional sensor data at block 510.

At block 530, the CASM provides a classification based on the one or more sensor data samples classified in the previous blocks. In one embodiment, the CASM determines that a classification determined by a subsequent sensor data sample overrides any earlier initial classification determination.

The output of the CASM may be used by an application (e.g., a program running on the device 100, such as an exercise program, activity logger, calendar application, or other software to read processed sensor data and associated classifications). The CASM may also output an estimated confidence associated with each classification.

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

It should be appreciated that when the device 100 is a mobile or wireless device that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an Electrocardiography (EKG) device, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for performing context inference for a mobile device comprising:
   receiving a data sample from at least a first sensor;
   performing a first classification of the data sample from the first sensor;
   determining a confidence value for the first classification, wherein determining the confidence value comprises:
      detecting a change in classification from a prior data sample classification, of a prior data sample from the first sensor, to the first data sample classification, wherein the change in classification matches a change in classification predetermined to trigger a confidence failure;
   activating a second sensor based on a determination the confidence value of the first classification fails to meet a confidence threshold; and
   performing a second classification of a second data sample from the activated second sensor jointly with the data from the at least first sensor.

2. The method of claim 1, further comprising:
   determining a confidence value for the second classification;
   activating a third sensor based on a determination that the confidence value fails to meet a confidence threshold; and
   performing a third classification of a third data sample.

3. The method of claim 1, wherein receiving data from at least a first sensor comprises:
   receiving data from two or more sensors.

4. The method of claim 1, wherein the confidence value is based on at least one of: a probability of correctly classifying the first data sample, a comparison of the first data sample to a data sample in a historical data set, and a difference between a nearest classification and a next nearest classification.

5. The method of claim 1, wherein the first sensor is part of a first sensor subsystem and the second sensor is part of a second sensor subsystem, and wherein activating the second sensor further comprises:
   powering up the second sensor subsystem, and
   communicating between the first and second sensor subsystems.

6. A machine readable non-transitory storage medium containing executable program instructions which cause a mobile device to perform a method for performing context inference for the mobile device, the method comprising:
   receiving a data sample from at least a first sensor;
   performing a first classification of the data sample from the first sensor;
   determining a confidence value for the first classification, wherein determining the confidence value comprises:
      detecting a change in classification from a prior data sample classification, of a prior data sample from the first sensor, to the first data sample classification, wherein the change in classification matches a change in classification predetermined to trigger a confidence failure;
   activating a second sensor based on a determination the confidence value of the first classification fails to meet a confidence threshold; and
   performing a second classification of a second data sample from the activated second sensor jointly with the data from the at least first sensor.

7. The machine readable non-transitory storage medium of claim 6, further comprising:

determining a confidence value for the second classification;
activating a third sensor based on a determination that the confidence value fails to meet a confidence threshold; and
performing a third classification of a third data sample.

8. The machine readable non-transitory storage medium of claim 6, wherein receiving data from at least a first sensor comprises:
receiving data from two or more sensors.

9. The machine readable non-transitory storage medium of claim 6, wherein the confidence value is based on at least one of: a probability of the classification occurring, a comparison of the first data sample to a data sample in a historical data set, and a difference between a nearest classification and a next nearest classification.

10. The machine readable non-transitory storage medium of claim 6, wherein the first sensor is part of a first sensor subsystem and the second sensor is part of a second sensor subsystem, and wherein activating the second sensor further comprises:
powering up the second sensor subsystem, and
communicating between the first and second sensor subsystems.

11. A data processing device comprising:
a processor;
a storage device coupled to the processor and configurable for storing instructions, which, when executed by the processor cause the processor to:
receive a data sample from at least a first sensor;
perform a first classification of the data sample from the first sensor;
determine a confidence value for the first classification, wherein to determine the confidence value comprises:
detect a change in classification from a prior data sample classification, of a prior data sample from the first sensor, to the first data sample classification, wherein the change in classification matches a change in classification predetermined to trigger a confidence failure;
activate a second sensor based on a determination the confidence value of the first classification fails to meet a confidence threshold; and
perform a second classification of a second data sample from the activated second sensor jointly with the data from the at least first sensor.

12. The data processing device of claim 11, further comprising instructions to:
determine a confidence value for the second classification;
activate a third sensor based on a determination that the confidence value fails to meet a confidence threshold; and
perform a third classification of a third data sample.

13. The data processing device of claim 11, wherein receiving data from at least a first sensor further comprises instructions to:
receive data from two or more sensors.

14. The data processing device of claim 11, wherein the confidence value is based on at least one of: a probability of the classification occurring, a comparison of the first data sample to a data sample in a historical data set, and a difference between a nearest classification and a next nearest classification.

15. The data processing device of claim 11, wherein the first sensor is part of a first sensor subsystem and the second sensor is part of a second sensor subsystem, and wherein activating the second sensor further comprises instructions to:
power up the second sensor subsystem, and
communicate between the first and second sensor subsystems.

16. An apparatus for performing context inference for a mobile device comprising:
means for receiving data from at least a first sensor;
means for performing a first classification of a data sample from the first sensor;
means for determining a confidence value for the first classification, wherein determining the confidence value comprises:
detecting a change in classification from a prior data sample classification, of a prior data sample from the first sensor, to the first data sample classification, wherein the change in classification matches a change in classification predetermined to trigger a confidence failure;
means for activating a second sensor based on a determination the confidence value of the first classification fails to meet a confidence threshold; and
means for performing a second classification of a second data sample from the activated second sensor jointly with the data from the at least first sensor.

17. The apparatus of claim 16, further comprising:
means for determining a confidence value for the second classification;
means for activating a third sensor based on a determination that the confidence value fails to meet a confidence threshold; and
means for performing a third classification of a third data sample.

18. The apparatus of claim 16, wherein receiving data from at least a first sensor comprises:
receiving data from two or more sensors.

19. The apparatus of claim 16, wherein the confidence value is based on at least one of: a probability of the classification occurring, a comparison of the first data sample to a data sample in a historical data set, and a difference between a nearest classification and a next nearest classification.

20. The apparatus of claim 16, wherein the first sensor is part of a first sensor subsystem and the second sensor is part of a second sensor subsystem, and wherein activating the second sensor further comprises:
means for powering up the second sensor subsystem, and
means for communicating between the first and second sensor subsystems.

* * * * *